US006889136B2

(12) United States Patent
Herz et al.

(10) Patent No.: US 6,889,136 B2
(45) Date of Patent: May 3, 2005

(54) DEVICE FOR POSITION-DEPENDENT REPRESENTATION OF INFORMATION

(75) Inventors: Torsten Herz, Effeltrich (DE); Bernhard Ober, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/354,966

(22) Filed: Jan. 31, 2003

(65) Prior Publication Data

US 2003/0187574 A1 Oct. 2, 2003

(30) Foreign Application Priority Data

Mar. 26, 2002 (DE) ........................................ 102 13 535

(51) Int. Cl.[7] ......................... G01C 21/30; G01C 21/26

(52) U.S. Cl. ......................... 701/207; 701/200; 701/35; 701/211; 340/990; 340/995.1; 340/995.14; 340/995.17; 73/178 R

(58) Field of Search ................................ 701/207, 200, 701/35, 211; 73/178 R; 340/988, 990, 995.1, 995.14, 995.17

(56) References Cited

U.S. PATENT DOCUMENTS

| | | | | | |
|---|---|---|---|---|---|
| 6,215,505 | B1 | * | 4/2001 | Minami et al. | 345/473 |
| 6,266,608 | B1 | | 7/2001 | Pertz | |
| 6,603,920 | B2 | * | 8/2003 | Ando et al. | 386/95 |
| 6,650,828 | B1 | * | 11/2003 | Hisatomi et al. | 386/70 |
| 6,658,200 | B2 | * | 12/2003 | Ando et al. | 386/95 |

FOREIGN PATENT DOCUMENTS

| | | | |
|---|---|---|---|
| DE | 39 25 057 | A1 | 1/1991 |
| DE | 43 24 531 | C1 | 12/1994 |
| DE | 195 06 890 | A1 | 8/1996 |
| DE | 199 35 537 | A1 | 2/2001 |
| EP | 1 081 668 | A2 | 3/2001 |
| EP | 1 100 063 | A2 | 5/2001 |
| WO | WO 01/54940 | A1 | 8/2001 |

OTHER PUBLICATIONS

OnStar owner's guide, 2001.*

* cited by examiner

*Primary Examiner*—Olga Hernandez
(74) *Attorney, Agent, or Firm*—Sughrue Mion, PLLC

(57) ABSTRACT

A device, a method, an adjusting device, and a mobile system for providing location-dependent information. It is proposed to use a device (1) which utilizes a navigation system (2) to detect its own position within an environment in relation to a map (4), in order to reproduce the location-dependent information. The device has a reproduction device (3) for providing the information (I1 . . . Im) associated with the corresponding locations (P1 . . . Pn). To store the information, a storage medium (5) is provided either locally in the device or in a central data memory (9) of a server (7) that is separate from the device. The range (10) around a position (P1 . . . Pn) within which the information is to be provided is defined by parameters, such as by radius (11) and/or by sector (12). An adjusting device (13) with an input screen (14), for entering the parameters, is also preferably provided.

8 Claims, 3 Drawing Sheets

DEVICE FOR POSITION-DEPENDENT REPRESENTATION OF INFORMATION

The following disclosure is based on German Patent Application No. 10213535.5 filed on Mar. 26, 2002, which is incorporated into this application by reference.

FIELD OF AND BACKGROUND OF THE INVENTION

The invention relates to a device for providing predefinable, position-dependent information.

When cleaning robots are used in publicly accessible buildings trafficked by the public, autonomous mobile systems are advantageously employed. These cleaning robots can maneuver around existing obstacles. The obstacles do not need to be always in the same place, rather their spatial arrangement and extent may vary. The autonomous mobile system is spatially oriented, e.g., by means of an electronic map of the environment, which is established by the autonomous system and used by it to determine its own position, and in which the obstacles or landmarks are entered.

According to an unrelated technological advance, position-dependent information can be provided in mobile systems, e.g., on displays of shopping carts, to alert the customer to special offers or promotions. Position-dependent information can also made available by means of portable systems, such as those used by visitors of museums or exhibits. For instance, at the Experience Music Project (EMP) in Seattle, Washington, position-dependent information is provided precisely when the visitor is located near the exhibit that is associated with the information. In this case, the position is signaled by transmitters or transponders that must be installed at the various respective locations of interest.

German Patent Specification DE 43 24 531 C1 discloses a method for producing a map of an environment and for determining, using a self-propelled unit, its own position within that environment. This Patent Specification is incorporated into the present application by reference.

OBJECTS OF THE INVENTION

One object of the invention is to define a device that makes it possible to provide location-dependent information in a simple manner.

SUMMARY OF THE INVENTION

According to one formulation, this and other objects are attained by a device that provides predefined items of information that are associated with corresponding positions of the device. The device has a navigation system to determine a current position of the device and a play-back device to render the predefined items of information that are associated with the corresponding current position.

The invention is based, inter alia, on the finding that it is increasingly important in an environment with a permanent glut of information to place the information relevant to a certain target group selectively and at suitable locations. For instance, it is very advantageous if advertisements for a certain product in a supermarket are made only in the vicinity of the product. This can be accomplished by means of static displays or posters, but these solutions take a lot of room. Furthermore, posters or displays must be installed or mounted and removed again after the promotion is finished. They may also be expensive to produce and dispose of or recycle. In the case of a supermarket chain, the posters or displays must be delivered to the individual branches from the place where they are manufactured. This involves shipping costs. An important advantage of the invention is that a device for providing position-dependent predefinable information, which is used, for instance, on a cleaning robot, provides special product-related information only in the vicinity of the corresponding product. Thus, the cleaning robot can advantageously be used to advertise products in its surroundings. A shopping cart actively moved by the user offers another possibility to provide information on products when the cart is pushed into their vicinity.

A device according to the invention furthermore makes it possible to provide a user, who is actively moving in an environment with the device, with predefined, position-dependent information. This is advantageous especially in museums and at exhibitions. The exhibits need not be overloaded with explanatory text panels. The information associated with the exhibit is instead made available by the device specifically at the corresponding position. This has the advantages that the visitor can visually concentrate on the exhibit and is not distracted by explanatory information. With this specific provision of information it is also possible to support different languages for different users.

One advantageous embodiment of the invention is characterized in that the current position is determined in relation to a map established by a navigation system. As a result, it is possible to use the position of the device as determined by means of a map of the surroundings, to provide the predefined, position-dependent information. The device preferably utilizes an orientation and map-producing method for mobile units to determine its current position within the environment. The device can, for instance, be a self-propelled device, e.g., a cleaning robot, or a device that is moved by external forces, e.g., a shopping cart or a portable device. The device provides specific, predefined information as a function of its current position with the aid of the playback (reproduction) device.

A further advantageous embodiment of the invention is characterized in that the device can be configured in a variety of ways, to provide information to a user of the device, to a person who is not directly using the device, and/or to another device. This allows the information to be provided to any of a variety of different addressees. These can be anonymous persons who happen to pass by the information source and are shown position-dependent advertisements. The information may also be provided directly to users of the device, e.g., to customers pushing their shopping carts through a supermarket or to visitors of museums and exhibitions who are provided with the information associated with corresponding exhibits by means of a portable device. The inventive device can also be used to provide position-dependent information to a machine or another device. For instance, a mobile robot, which supplies components (diodes, resistors) for automatic component insertion machines for PCBs directly to the machine, provides the corresponding machine with data, e.g., regarding the manufacturer, the part number, and the number of components delivered. Such a device according to the invention facilitates material tracking and thus has a positive impact on quality assurance. Because the automatic machine receives data regarding the number of units supplied, a message can be generated sufficiently in advance before the components are used up and a new delivery can be triggered. This avoids costly downtime.

Another advantageous embodiment of the invention is characterized in that the play-back device supplies the predefined information in any of many different forms, including acoustic, visual, olfactible, and/or tangible form, and/or any other form that can be detected by man or machine. The play-back device can thus supply the predefined, position-dependent information in any of a wide range of different forms. One inventive embodiment of the play-back device is, for instance, a display mounted to or integrated into the device, a TV monitor, or some other device for reproducing visual information, such as e-paper (electronic paper). In this type of an embodiment the play-back device provides the information in the form of texts or static or moving images. Another inventive embodiment of the play-back device is, for instance, a device for representing virtual or augmented reality, which is provided position-dependent to the user or to a third party that is not using the device directly. A maintenance technician or mechanic in, e.g., a manufacturing or a production plant is provided, for instance, with equipment-specific data. A further advantageous embodiment of the play-back device is, for instance, a headset or some other device that supplies acoustic signals in such a way that they are received by the addressee. Texts that explain exhibits in museums or at exhibitions can be reproduced by the device in this manner, likewise acoustic orientation aids for the hearing impaired, or instructions for orientation during movement in an obscure environment, such as sewer systems or mining tunnels. For an integrated sensory impression, e.g., in museums or at exhibitions, it is advantageous to provide a play-back device that supplies, solely or in addition, position-dependent olfactory signals such as fragrances, tactile signals such as vibrations, or sensible signals such as temperature changes. This makes it possible to reproduce environmental factors in a manner that is close to reality. If the information is to be provided for a machine or some other technical equipment, it is advantageous to use an embodiment of the invention that reproduces, for instance, predefinable information in digital or in some other machine-readable form.

A further advantageous embodiment of the invention is characterized in that the device incorporates a storage medium for storing the information, or that the device has a transmitter/receiver for receiving information transmitted to the device by means of a separate, stationary base unit. This gives the options either to store the predefined position-dependent information on a storage medium in the device itself or to store the information on a stationary base unit (server) from where it can be transmitted to the device. The most advantageous and appropriate technical implementation of the invention in a given context will depend on the type and amount of information to be provided, and perhaps other factors.

The object of the invention is further attained by an adjusting device for setting a predefined space and/or time range for the device providing predefined information associated with a given position of the device. As described above, the device itself has at least a navigation system to determine a current position of the device and a play-back device to reproduce the predefined information associated with the corresponding current position.

One advantageous embodiment of the adjusting device is characterized in that the adjusting device has means for setting a radius and a sector for the reproduction of the information associated with the corresponding position. By adjusting a predefined space and/or time range for the provision of position-dependent predefined information, it is possible specifically to adapt the size of the environment by entering a radius within which the information is to be provided by the play-back unit of the device. This ensures a targeted provision of information, enabling a user or a third person to recognize the relation between the information and the position, and thus facilitates a contextual processing of the information, i.e., comprehension. Because the inventive adjusting device is preferably embodied in such a way that a sector for the provision of information can be defined in addition to the size of the environment, it is advantageously possible to orient the provision of information. The device provides the information only when the device is approaching the associated position within the defined sector, similarly to a sector of a navigational light within which a viewer at sea can perceive a light signal. The provision of information as a function of the target sector is advantageous, for instance, for a user in a museum or at an exhibition if the corresponding information on an exhibit is meaningful or relevant only from a certain angle. Similarly to navigation at sea with the aid of navigation lights, the provision of predefined information as a function of the target sector can also be used to orient or to determine the position of the viewer/user.

A further advantageous embodiment of the adjusting device is characterized in that it permits the setting of a time interval during which the same information associated with the corresponding position should not be repeated. As a result, a maximum repetition rate for the provision of the information can be entered. Thus it is possible to define a time period that must elapse before the exact same information associated with the position is again provided to a third party or a machine. This prevents constant and pointless repetition of images on a display, spoken messages, or other machine-relevant information, that could otherwise become an annoyance.

BRIEF DESCRIPTION OF THE DRAWINGS

The invention will now be described and explained in greater detail with reference to exemplary embodiments depicted in the figures in which.

DETAILED DESCRIPTION OF THE PREFERRED EMBODIMENTS

Figure 1:
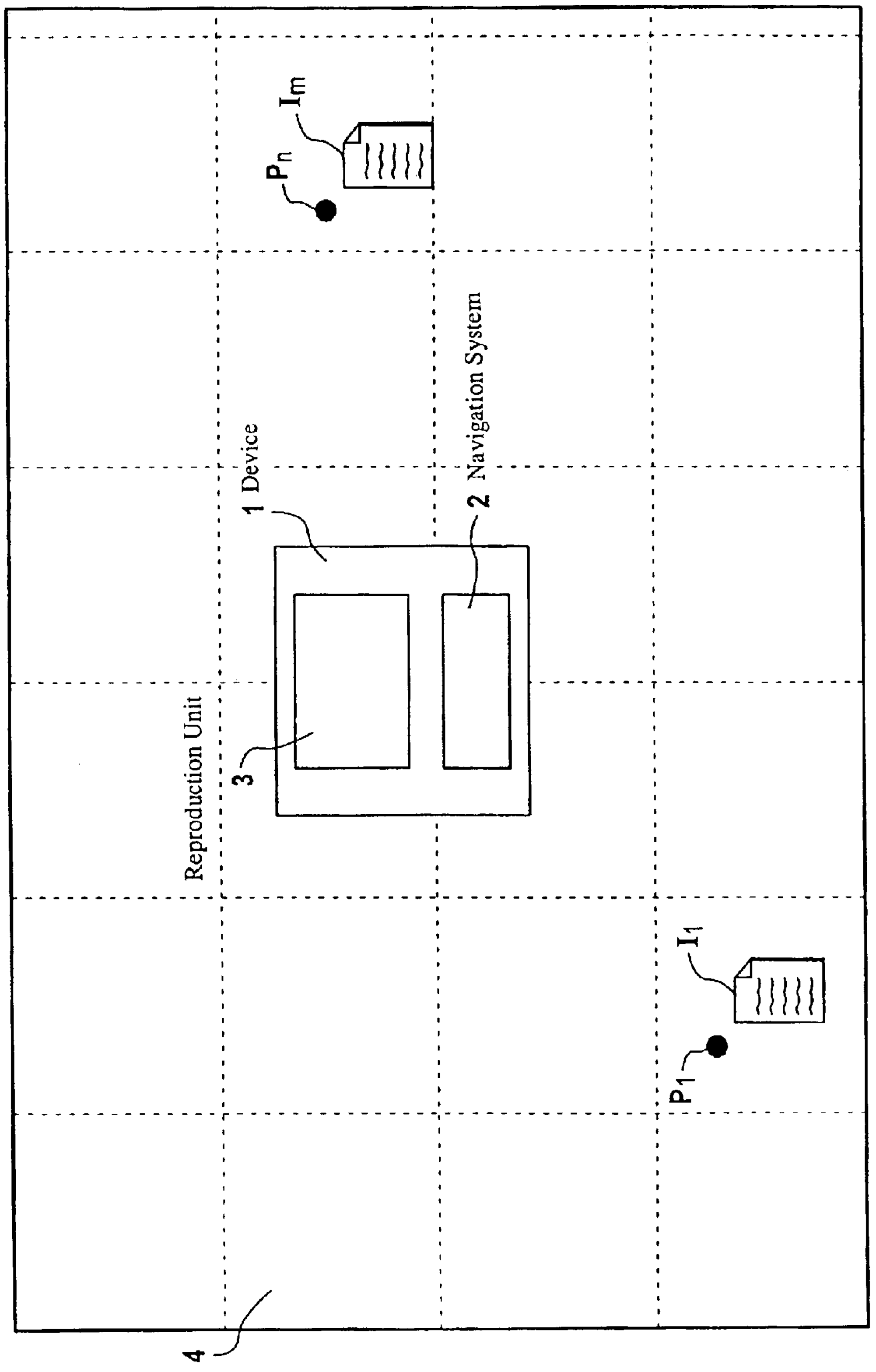
FIG. 1 is a schematic representation of an exemplary embodiment of the device for providing predefined position-dependent information.

FIG. 1 is a schematic representation of an exemplary embodiment of a device 1, e.g., a mobile cleaning robot, a shopping cart, or a portable, e.g. handheld, device. By means of a device-internal navigation system 2, the device 1 knows its actual, current position within an environment relative to a map 4 that reflects this environment. The device depicted in FIG. 1 also includes a play-back device 3 for reproducing specific information I1 . . . Im. This information can be predefined and the associated positions P1 . . . Pn for the reproduction of the corresponding information I1 . . . Im are stored in the map 4.

A special feature of the device 1 depicted in FIG. 1 essentially is that different information contents I1 . . . Im can be predefined. The device makes it possible to associate a piece of information I1 . . . Im with a position P1 . . . Pn on a map 4 of the environment. By means of the device-internal navigation system 2, the device detects its current position on the map 4. If the device approaches a position P1 . . . Pn, the information I1 . . . Im associated with that position is reproduced by the play-back unit 3 of the device 1. Preferred embodiments of the play-back unit 3 include, in particular, a display, e-paper, a headset, and/or a loudspeaker. This enables contextual, targeted reproduction of the information as a function of the environment in which the device is located. For instance, in the case of mobile cleaning robots, a display or e-paper can be used to show an advertisement for products near which the robot is located at the time. It is also possible to reproduce the information acoustically, particularly to comment on exhibits or installations in museums or at exhibitions.

Figure 2:
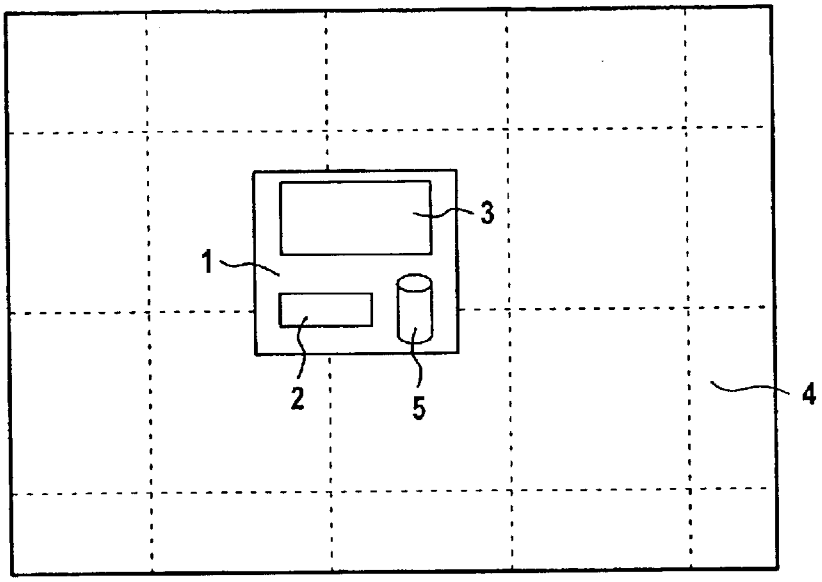
FIG. 2 is a schematic representation of a device with a local data memory for the predefined information.

FIG. 2 shows a schematic representation of a device 1 with a local data memory 5 in which the predefined information I1 . . . Im is stored in the device 1. As a function of the corresponding position determined on the map 4 by means of the navigation system 2, the information is read from the local data memory 5 and made available by means of the play-back device 3.

A special feature of the embodiment depicted in FIG. 2 is that the information can be reproduced at any time, independent of any additional data transmission to the device. The position-dependent information in this case is provided by the device itself. This embodiment of the invention is advantageous if many devices are used simultaneously in spatial proximity but in different positions and the amount of the predefined information is limited. A portable device for the contextual provision of information in a museum or at an exhibition is one example where this inventive embodiment is particularly useful.

Figure 3:
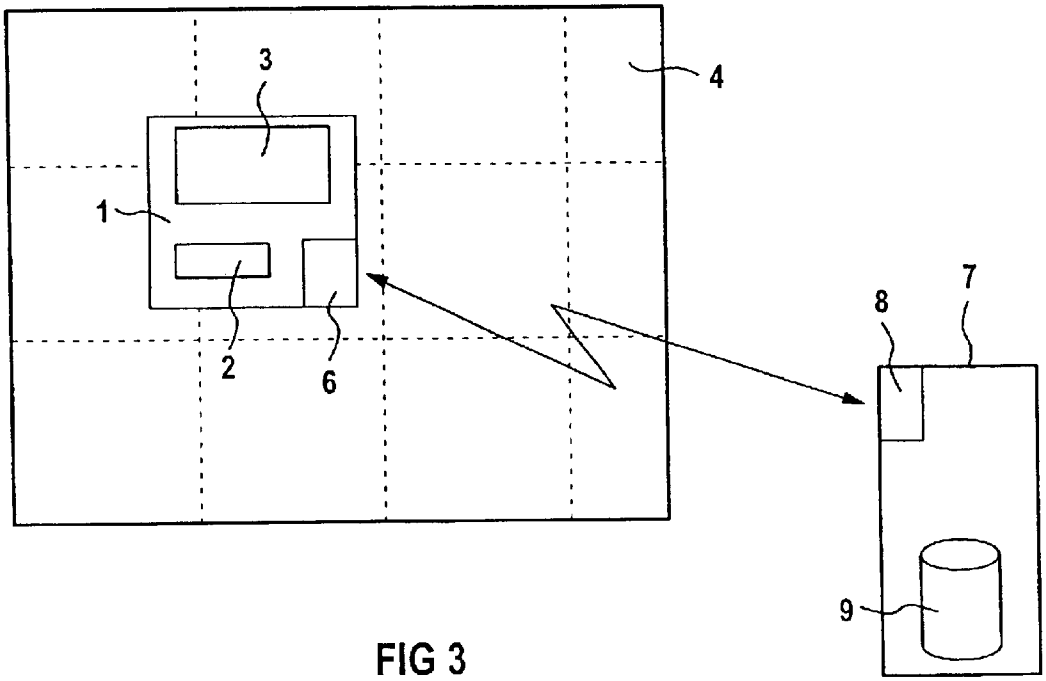
FIG. 3 is a schematic representation of a device with an external, central data memory for the information and for transmission of the information between the central data memory and the device.

FIG. 3 is a schematic representation of a device 1 with a transmitter and receiver 6 for information that is stored in a central data memory 9 at a base station 7 and is transmitted from the data memory 9 to the device 1 by means of a transmitter and receiver 8. In this inventive embodiment, predefined information I1 . . . Im is stored on a central device 7 (server) in the data memory 9 and is read from the central data memory 9 as a function of the corresponding position determined on map 4 by means of the navigation system 2. With the aid of a transmitter 8 installed on the central device 7, this position-dependent information is transmitted to a receiver 6 of the device 1. The device 1 then provides the received information by means of the play-back device 3.

A particular feature of the inventive embodiment depicted in FIG. 3 is the ability to transmit information to the device only when it needs to be provided as a function of the positions associated therewith. The information can be transmitted, for instance, by radio (using DECT, GSM, UTMS or WLAN). Transmission via infrared or ultrasound is also feasible. Thus, large amounts of data need not be stored directly and permanently in the device. This embodiment is advantageous, for instance, if equipment-specific information is to be provided, e.g., equipment data, or operating or repair instructions for maintenance or other personnel of large technical plants.

Figure 4:
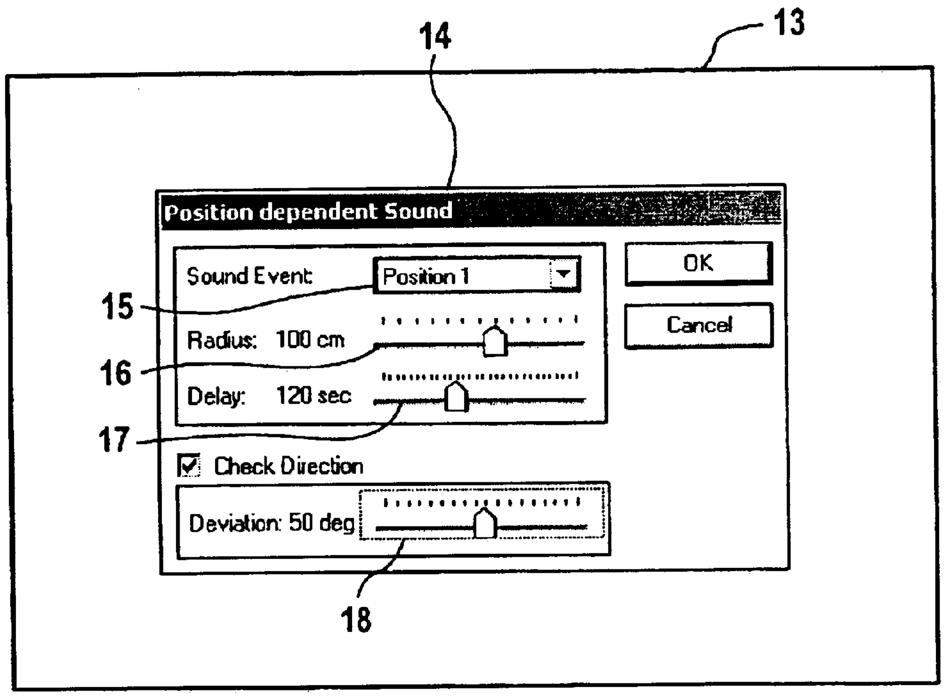
FIG. 4 shows an adjusting device with a screen for entering position-specific parameters to set a space and time range for the reproduction of information.

FIG. 4 shows an adjusting device 13 with a user interface 14 for entering position-specific parameters to set a range in which the information is to be reproduced. The user interface includes an input screen 14 with a first screen area for selecting the corresponding position 15 and additional areas, given by way of example, for setting the parameters associated with the selected position. These include, e.g., radius 16, repetition rate 17, and sector aperture angle, the direction of which can be changed by rotation.

A special feature of the embodiment shown in FIG. 4 is the simple setting of the desired parameters for the corresponding position to adjust the environment in which the associated information is to be provided. If the parameters need be changed, any user can easily enter the new settings.

Figure 5:
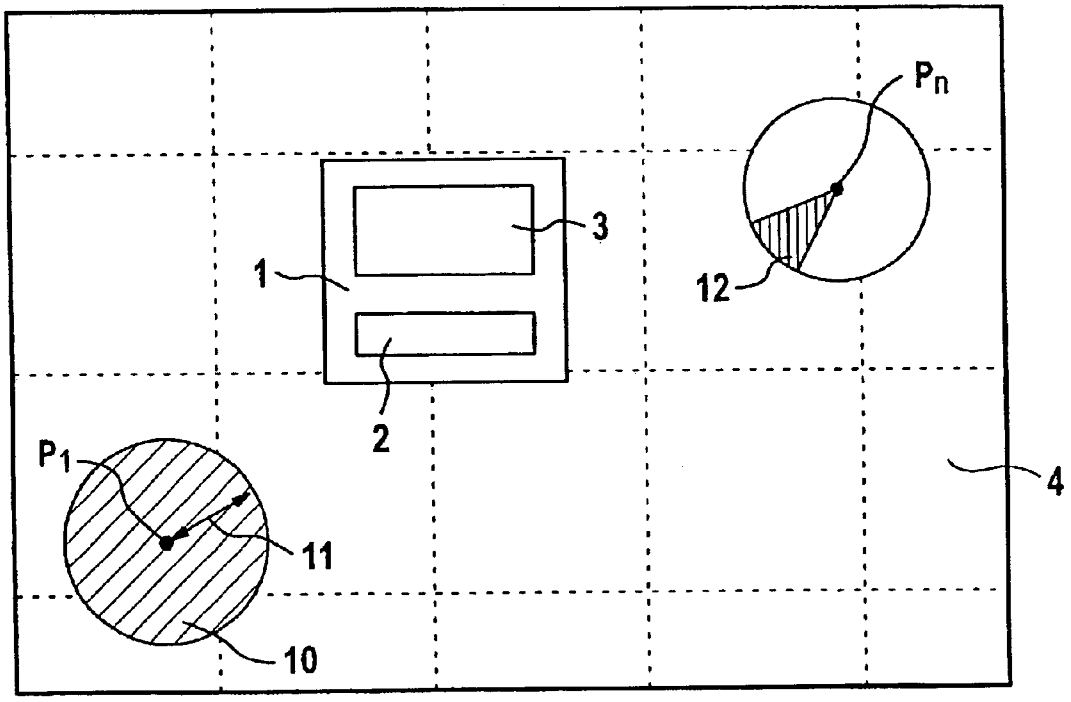
FIG. 5 is a schematic representation of an exemplary embodiment of a device with a defined radius and a defined direction for the reproduction of information.

FIG. 5 shows a schematic representation of a device 1 with parameterized ranges 10, given by way of example, around a position P1 . . . Pn, within which the corresponding position-dependent information I1 . . . Im is to be provided. The device 1 knows its own position in relation to the parameterized ranges 10 with reference to a map 4 accessible via the navigation system 2. The play-back device 3 provides the predefined position-dependent information exactly when device 1 is within the range defined around the corresponding position. The range 10 around the respective positions are defined via a selectable radius 11. A sector 12 is defined by entering directional data and an aperture angle.

A special feature of the inventive embodiment depicted in FIG. 5 is the ability to enter a defined range around a position where the information is to be provided. This prevents overlapping of the ranges if there are several closely spaced positions where information is to be provided. This ensures a precise assignment of the information to its respective position. The definition of a sector enables the reproduction of the information as a function of the direction of movement. This embodiment is advantageous, for instance, if the information related to a position is relevant only from a certain angle.

In summary, the invention thus relates to a device, a method, an adjusting device, and a mobile system for providing position-dependent information. A device 1 is proposed that includes a navigation system 2 to detect its own position within an environment relative to a map 4, in order to reproduce position-dependent, predefinable information. The device also includes a play-back device 3 that provides the information I1 . . . Im associated with the corresponding positions P1 . . . Pn. To store the information, a storage medium is provided either locally on device 5 or remotely on a central data memory 9 on a server 7. The range 10 around a position P1 . . . Pn where the information is to be provided is defined by parameters such as a radius 11 and a sector 12. An adjusting device 13 with an input screen 14 is used to enter these parameters.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. Device providing predefined items of information (I1 . . . Im) that are respectively associated with positions (P1 . . . Pn) of the device, comprising:

a navigation system for determining a current position (P1 . . . Pn) of the device;

a play-back device for reproducing any of the items of information (I1 . . . Im) that are associated with the current position (P1 . . . Pn) of the device in response to the determination of the current position (P1 . . . Pn); and an adjusting device for setting at least one of a predefined space range and a predefined time range for the play-back device to reproduce any of the items of information (I1 . . . Im) that are associated with the current position (P1 . . . . Pn) of the device, wherein the adjusting device comprises a spatial adjustment device for setting a radius and a sector for the play-back device to reproduce any of the items of information (I1 . . . Im) that are associated with the current position (P1 . . . Pn) of the device.

2. Device as claimed in claim 1, wherein the navigation system provides a map (4) and determines the current position (P1 . . . Pn) in relation to the map (4).

3. Device as claimed in claim 1, further comprising a device for providing the associated items of information (I1 . . . Im)to at least one of a user of the device, to a person not directly using the device, and to another technological device.

4. Device as claimed in claim 1, wherein the play-back device reproduces the associated items of information (I1 . . . Im) in at least one of: acoustic form, visual form, olfactible form, tangible form, sensible form and a form detectable by another technological device.

5. Device as claimed in claim 1, further comprising a storage medium for storing the information (I1 . . . Im).

6. Device as claimed in claim 1, further comprising a transmitter-receiver for receiving the predefined items of information (I1 . . . Im) from a stationary base unit.

7. Device as claimed in claim 1, wherein the adjusting device further comprises a temporal adjustment device for setting a time interval for the play-back device to reproduce any of the items of information (I1 . . . Im) that are associated with the current position (P1 . . . Pn) of the device.

8. A mobile system comprising:

a mobile unit that traverses a plurality of positions; and a device providing predetermined items of information that are respectively associated with the positions of the device, said device comprising:

a navigation system, completely contained within said device, that determines a current position of said device;

a play-back system triggered by said navigation system to reproduce those of the items of information that are associated with the current position of the device; and an adjusting device for setting at least one of a predefined space range and a predefined time range for the play-back system to reproduce any of the items of information that are associated with the current position of the device, wherein the adjusting device comprises a spatial adjustment device for setting a radius and a sector for the play-back system to reproduce any of the items of information that are associated with the current position of the device.

* * * * *